(12) United States Patent  
Toland

(10) Patent No.: US 6,471,241 B1
(45) Date of Patent: Oct. 29, 2002

(54) STEERING WHEEL AIR BAG PROTECTIVE DEVICE

(76) Inventor: Joseph Toland, 117 E. Louisville Ave., Wildwood Crest, NJ (US) 08260

( * ) Notice: Subject to any disclaimer, the term of this patent is extended or adjusted under 35 U.S.C. 154(b) by 0 days.

(21) Appl. No.: 09/901,772

(22) Filed: Jul. 10, 2001

(51) Int. Cl.$^7$ ............................................... B60R 21/22
(52) U.S. Cl. ..................................... 280/731; 280/734.2
(58) Field of Search .............................. 280/728.2, 729, 280/730.1, 731, 743.2, 743.1, 728.1

(56) References Cited

U.S. PATENT DOCUMENTS

| | | | | |
|---|---|---|---|---|
| 3,437,350 A | * | 4/1969 | Clark | 280/750 |
| 3,638,755 A | * | 2/1972 | Sack | 280/729 |
| 5,498,023 A | * | 3/1996 | Adams et al. | 280/728.2 |
| 5,560,648 A | * | 10/1996 | Rhule et al. | 280/731 |
| 5,746,446 A | * | 5/1998 | Breed et al. | 280/729 |
| 5,810,385 A | * | 9/1998 | Henseler et al | 280/743.2 |
| 6,065,167 A | * | 5/2000 | Gancy | 5/655.3 |
| 6,334,627 B1 | * | 1/2002 | Heym et al. | 280/743.2 |
| 6,371,510 B1 | * | 4/2002 | Marriott et al. | 280/730.1 |

* cited by examiner

*Primary Examiner*—Peter C. English
(74) *Attorney, Agent, or Firm*—Goldstein & Lavas, P.C.

(57) ABSTRACT

A steering wheel air bag protective device including a circular ring positionable within an air bag compartment that is disposed interiorly of a steering wheel. The circular ring has a hollow central section for receiving the air bag therethrough. A flexible web extends within the hollow central section of the circular ring and is disposed over the air bag of the steering wheel.

4 Claims, 2 Drawing Sheets

STEERING WHEEL AIR BAG PROTECTIVE DEVICE

BACKGROUND OF THE INVENTION

The present invention relates to a steering wheel air bag protective device and more particularly pertains to controlling the impact of an air bag after it has been discharged.

The use of vehicle safety devices is known in the prior art. More specifically, vehicle safety devices heretofore devised and utilized for the purpose of making the safer operation of motor vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,096,220 to Nakajima discloses a cover for an air bag system consisting of a network of synthetic fibers. U.S. Pat. No. 5,154,444 to Nelson discloses an air bag retainer device consisting of a smooth outer skin. U.S. Pat. No. 5,179,132 to Mizuno discloses a polyurethane pad for an air bag.

While these devices fulfill their respective, particular objective and requirements, the aforementioned patents do not describe a steering wheel air bag protective device for controlling the impact of an air bag after it has been discharged.

In this respect, the steering wheel air bag protective device according to the present invention substantially departs from the conventional concepts and designs of the prior art, and in doing so provides an apparatus primarily developed for the purpose of controlling the impact of an air bag after it has been discharged.

Therefore, it can be appreciated that there exists a continuing need for a new and improved steering wheel air bag protective device which can be used for controlling the impact of an air bag after it has been discharged. In this regard, the present invention substantially fulfills this need.

SUMMARY OF THE INVENTION

In the view of the foregoing disadvantages inherent in the known types of vehicle safety devices now present in the prior art, the present invention provides an improved steering wheel air bag protective device. As such, the general purpose of the present invention, which will be described subsequently in greater detail, is to provide a new and improved steering wheel air bag protective device which has all the advantages of the prior art and none of the disadvantages.

To attain this, the present invention essentially comprises a circular ring that is positionable within an air bag compartment that is disposed interiorly of a steering wheel. The circular ring is securable to a steering wheel post of the steering wheel. The circular ring has a hollow central section for receiving the air bag therethrough. A flexible web extends within the hollow central section of the circular ring and is disposed over the air bag of the steering wheel. The flexible web consists of a plurality of concentric flexible rings positioned centrally over the air bag. The flexible web includes a plurality of flexible extensions extending between the concentric rings. An outermost concentric ring is secured to the circular ring.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved steering wheel air bag protective device which has all the advantages of the prior art vehicle safety devices and none of the disadvantages.

It is another object of the present invention to provide a new and improved steering wheel air bag protective device which may be easily and efficiently manufactured and marketed.

It is a further object of the present invention to provide a new and improved steering wheel air bag protective device which is of durable and reliable construction.

An even further object of the present invention is to provide a new and improved steering wheel air bag protective device which is susceptible of a low cost of manufacture with regard to both materials and labor, and which accordingly is then susceptible of low prices of sale to the consuming public, thereby making such a steering wheel air bag protective device economically available to the buying public.

Even still another object of the present invention is to provide a new and improved steering wheel air bag protective device for controlling the impact of an air bag after it has been discharged.

Lastly, it is an object of the present invention to provide a new and improved steering wheel air bag protective device including a circular ring positionable within an air bag compartment that is disposed interiorly of a steering wheel. The circular ring has a hollow central section for receiving the air bag therethrough. A flexible web extends within the hollow central section of the circular ring and is disposed over the air bag of the steering wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
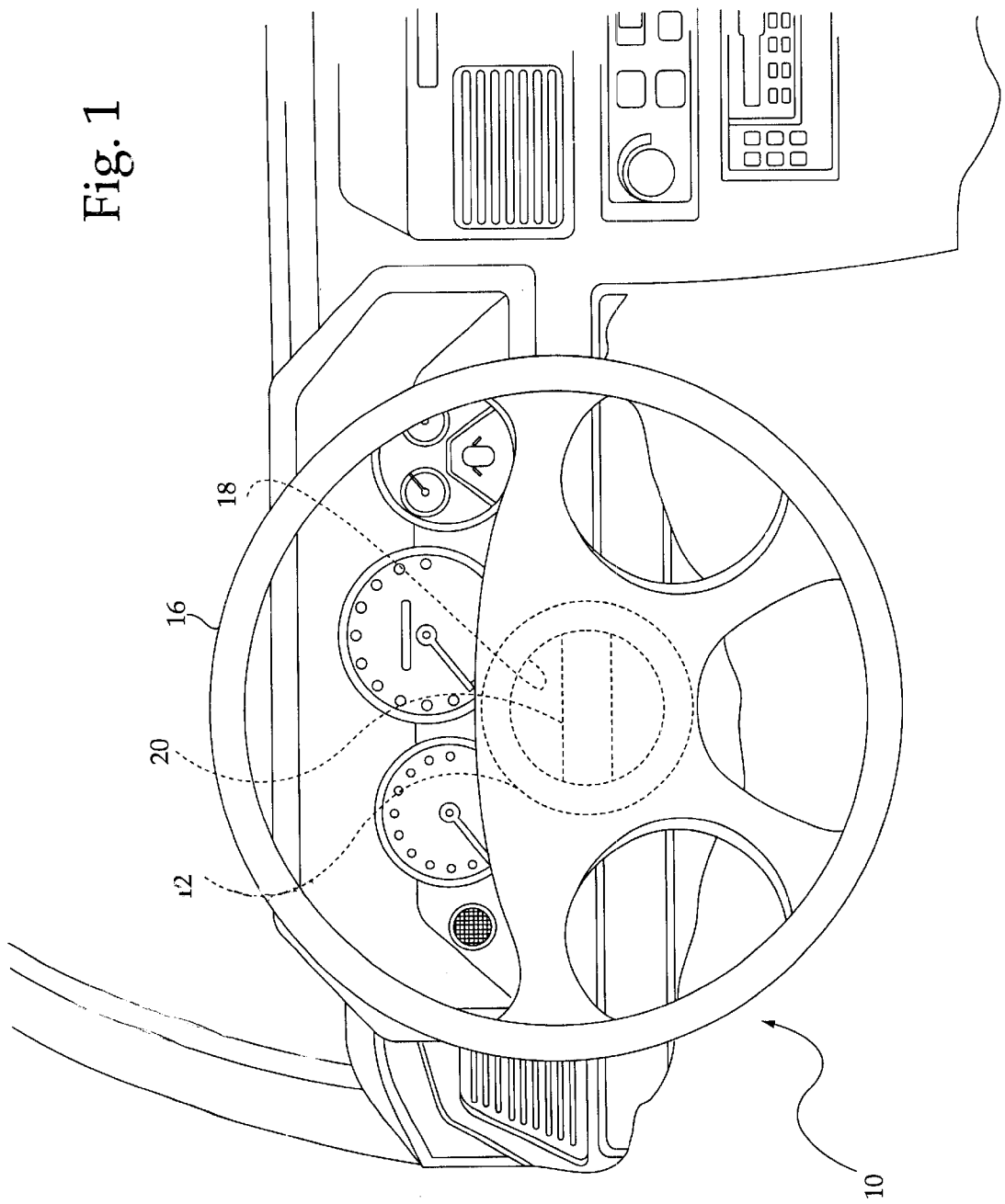
FIG. 1 is a front view of the preferred embodiment of the steering wheel air bag protective device constructed in accordance with the principles of the present invention.
Figure 3:
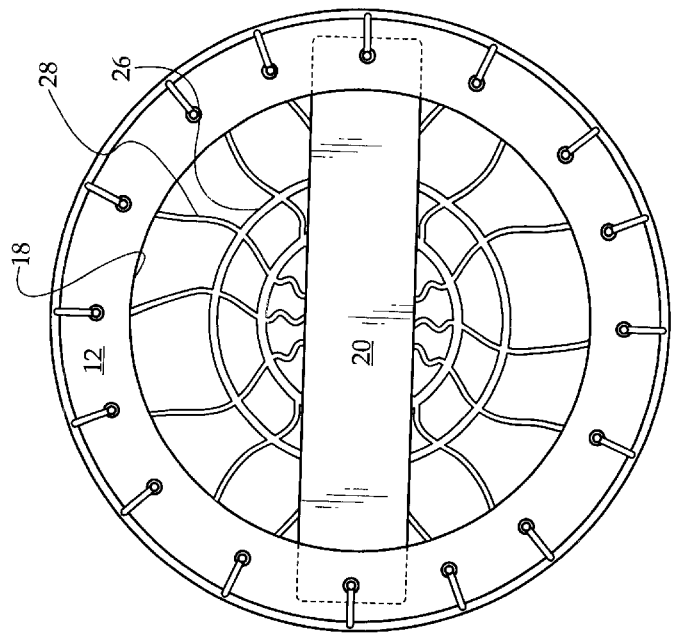
FIG. 3 is a top plan of the present invention.
Figure 2:
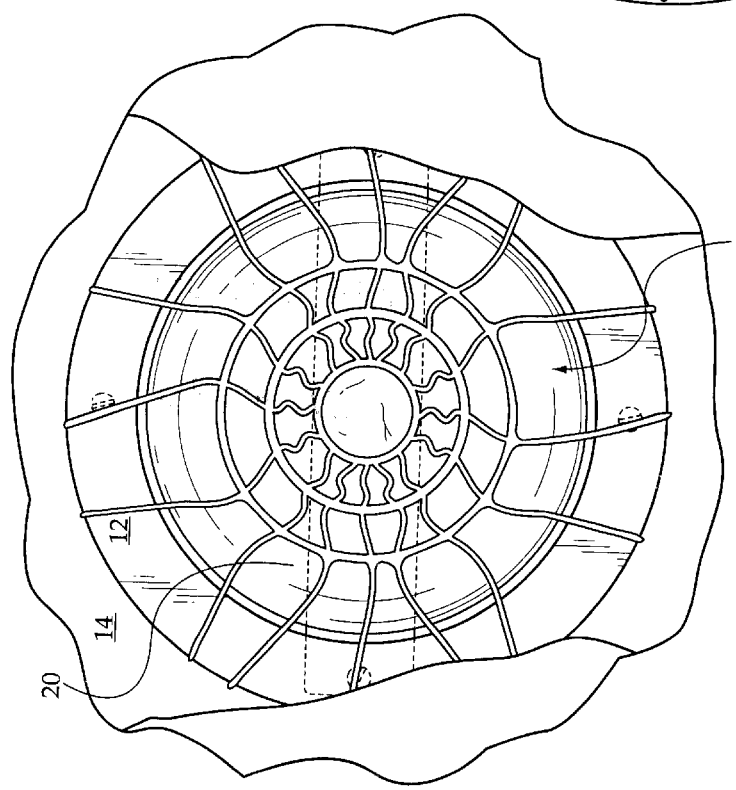
FIG. 2 is a front view of the present invention illustrating the interior of the steering wheel.

With reference now to the drawings, and in particular, to FIGS. 1 through 3 thereof, the preferred embodiment of the new and improved steering wheel air bag protective device embodying the principles and concepts of the present invention and generally designated by the reference number 10 will be described.

Specifically, it will be noted in the various figures that the device relates to a steering wheel air bag protective device for controlling the impact of an air bag after it has been discharged. In its broadest context, the device consists of a circular ring and a flexible web. Such components are individually configured and correlated with respect to each other so as to attain the desired objective.

The circular ring 12 is positionable within an air bag compartment 14 that is disposed interiorly of a steering wheel 16. The circular ring 12 is securable to a steering wheel post of the steering wheel 16. The circular ring 12 has a hollow central section 18 for receiving the air bag 20 therethrough.

The flexible web 24 extends within the hollow central section 18 of the circular ring 12 and is disposed over the air bag 20 of the steering wheel 16. The flexible web 24 consists of a plurality of concentric flexible rings 26 positioned centrally over the air bag 20. The flexible web 24 includes a plurality of flexible extensions 28 extending between the concentric rings 26. An outermost concentric ring is secured to the circular ring 12.

In use, the present invention will lessen the impact the air bag 20 will have on the driver of the vehicle upon discharge. The present invention will serve to prevent the air bag 20 from quickly discharging against the driver allowing the driver some forward momentum before being met by the air bag 20. This will lessen the severity of air bag injuries during an accident.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

what is claimed as being new and desired to be protected by Letters Patent of the United States is as follows:

1. A steering wheel air bag protective device for controlling the impact of an air bag after it has been discharged comprising, in combination:

a circular ring positionable within an air bag compartment that is disposed interiorly of a steering wheel, the circular ring being securable to a steering wheel post of the steering wheel, the circular ring having a hollow central section for receiving the air bag therethrough; and a flexible web extending within the hollow central section of the circular ring and disposed over the air bag of the steering wheel, the flexible web being comprised of a plurality of concentric flexible rings positioned centrally over the air bag, the flexible web including a plurality of flexible extensions extending between the concentric rings, an outermost concentric ring being secured to the circular ring.

2. A steering wheel air bag protective device for controlling the impact of an air bag after it has been discharged comprising, in combination:

a circular ring positionable within an air bag compartment that is disposed interiorly of a steering wheel, the circular ring having a hollow central section for receiving the air bag therethrough; and a flexible web extending within the hollow central section of the circular ring and disposed over the air bag of the steering wheel, wherein the flexible web is comprised of a plurality of concentric flexible rings positioned centrally over the air bag.

3. The steering wheel air bag protective device as set forth in claim 2, wherein the flexible web includes a plurality of flexible extensions extending between the concentric rings.

4. The steering wheel air bag protective device as set forth in claim 2, wherein an outermost concentric ring is secured to the circular ring.

* * * * *